United States Patent

Muto et al.

Patent Number: 5,478,996
Date of Patent: Dec. 26, 1995

[54] IC CARD PROCESSING APPARATUS HAVING FUNCTION FOR DETECTING AND PROTECTING DISHONEST UTILIZATION USING SWITCH MEANS

[75] Inventors: Norikazu Muto; Katsuhiro Taka, both of Atsugi, Japan

[73] Assignee: Anritsu Corporation, Tokyo, Japan

[21] Appl. No.: 310,653

[22] Filed: Sep. 22, 1994

[30] Foreign Application Priority Data

Dec. 31, 1993 [JP] Japan .................... 5-350388

[51] Int. Cl.$^6$ .................................. G06K 7/06
[52] U.S. Cl. .................................. 235/441
[58] Field of Search ................... 235/441, 439; 307/112, 116, 117; 340/825.34

[56] References Cited

U.S. PATENT DOCUMENTS 4,999,601  3/1991  Gervais .................. 235/492

FOREIGN PATENT DOCUMENTS 2554262  3/1985  France.

*Primary Examiner*—John Shepperd
*Assistant Examiner*—Michael G. Lee
*Attorney, Agent, or Firm*—Frishauf, Holtz, Goodman, Langer & Chick

[57] ABSTRACT

In order to enable a processing circuit to certainly detect insertion of a wrong card having a conductive line without using a plate member or a coil regulating the shape of a card storage unit, when the wrong card having the conductive line is inserted from a card insertion port, formed in one surface of a housing, into the card storage unit in the housing, and the external terminal of the card is brought into contact with a contact terminal, a radio wave radiated into the housing is induced to the conductive line. A reception circuit connected to the contact terminal receives, of signals appearing at the conductive line, a radio wave signal radiated from a clock signal source in a communication control unit located at a position spaced apart from the card storage unit and supplies the detection output of the radio wave signal to a determination circuit. The determination circuit determines insertion of the wrong card having the conductive line on the basis of the detection output. During this determination operation, a switch element is set in an open state, and the contact terminal is disconnected from the processing circuit, so that the voltage induced to the conductive line of the wrong card and the voltage induced to the external terminal of a proper card can be taken a sufficient value to determine the difference therebetween.

12 Claims, 6 Drawing Sheets

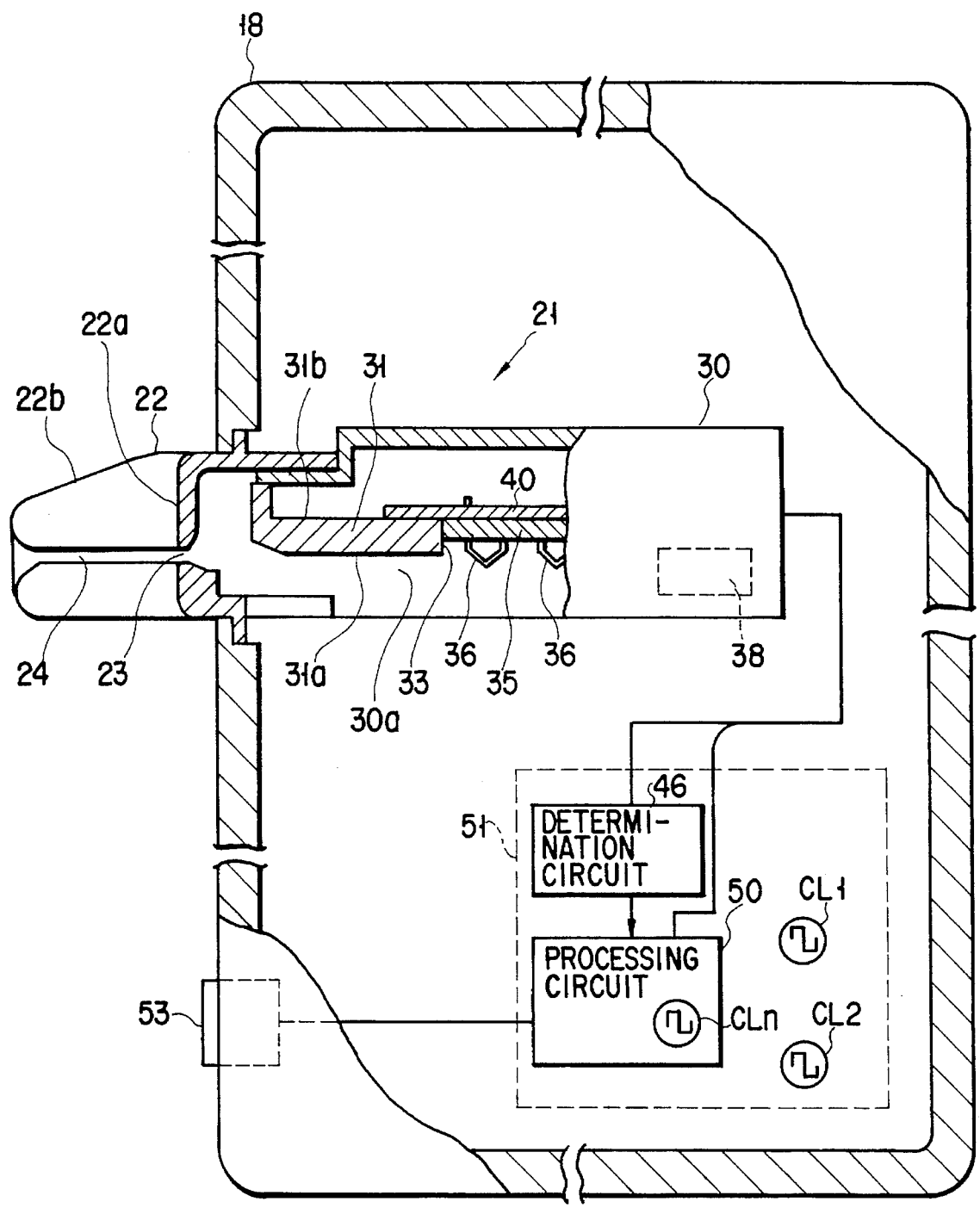
F I G. 1

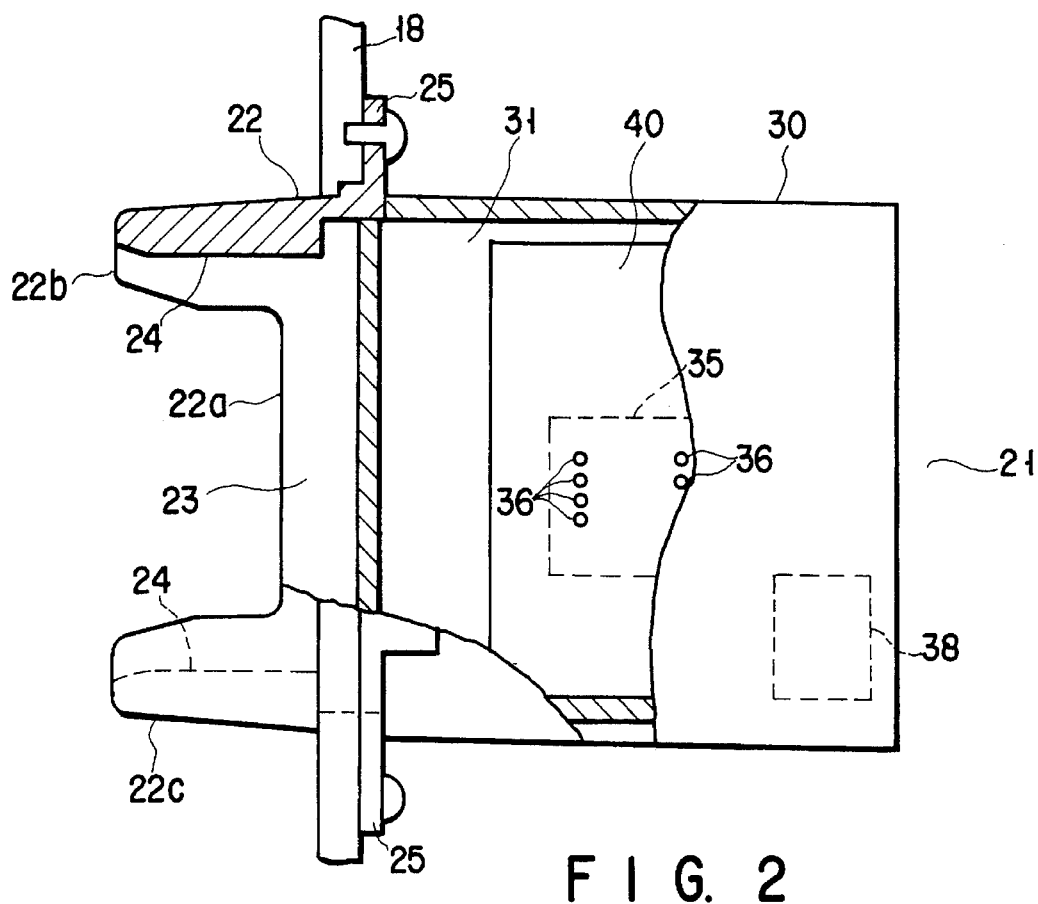
F I G. 2
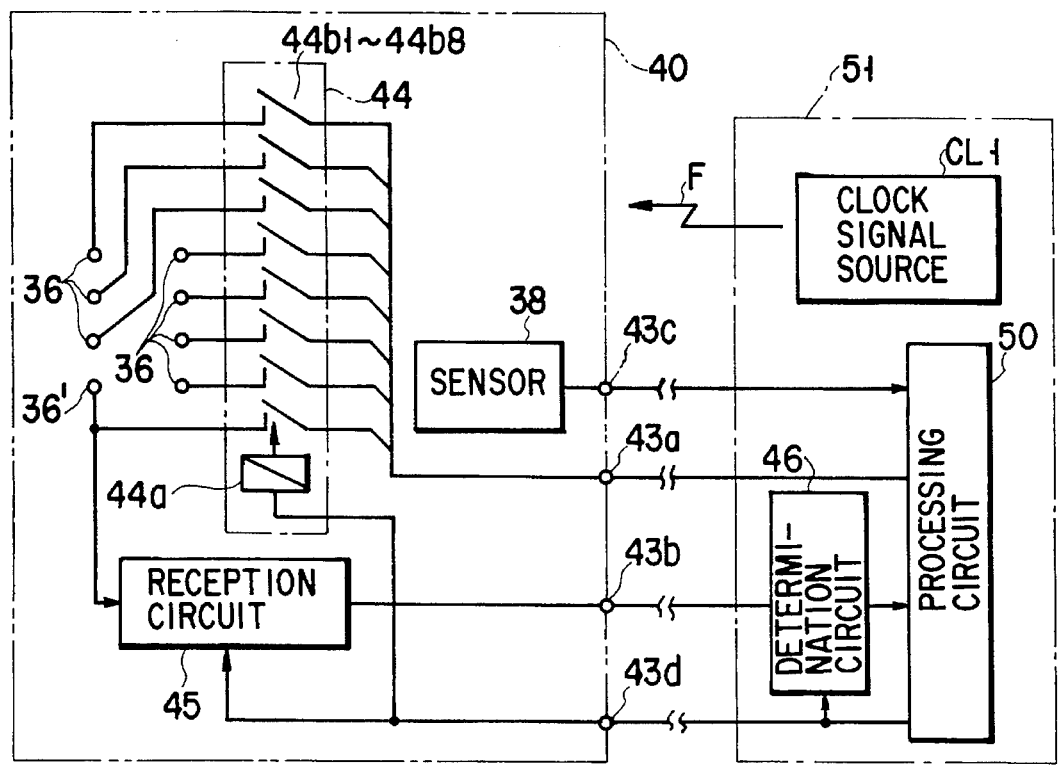
F I G. 3

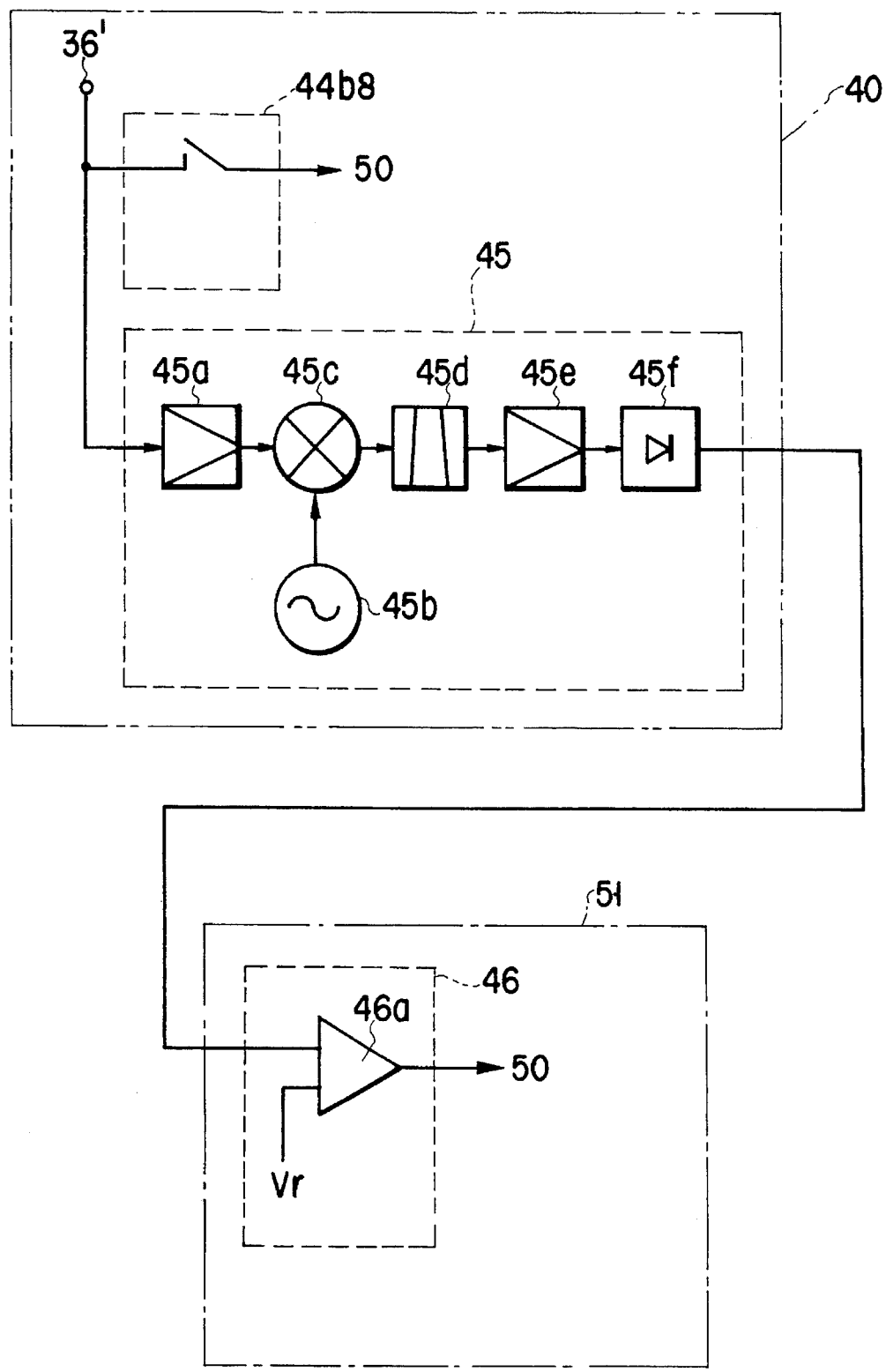
F I G. 4

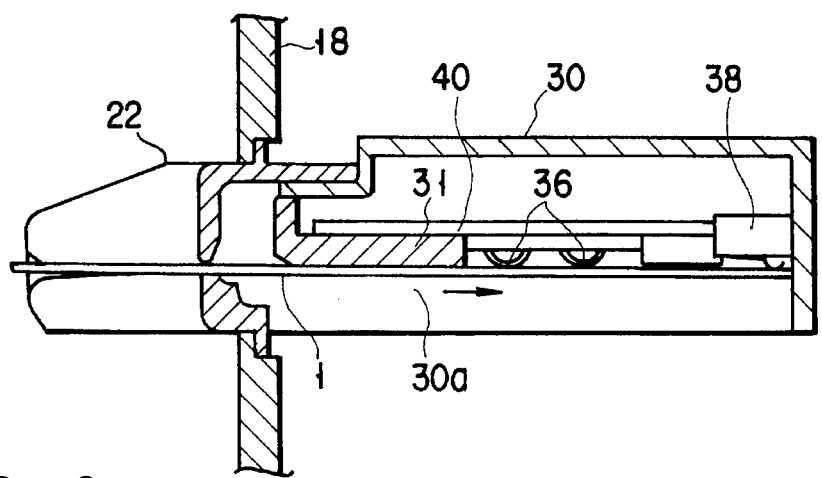
F I G. 6
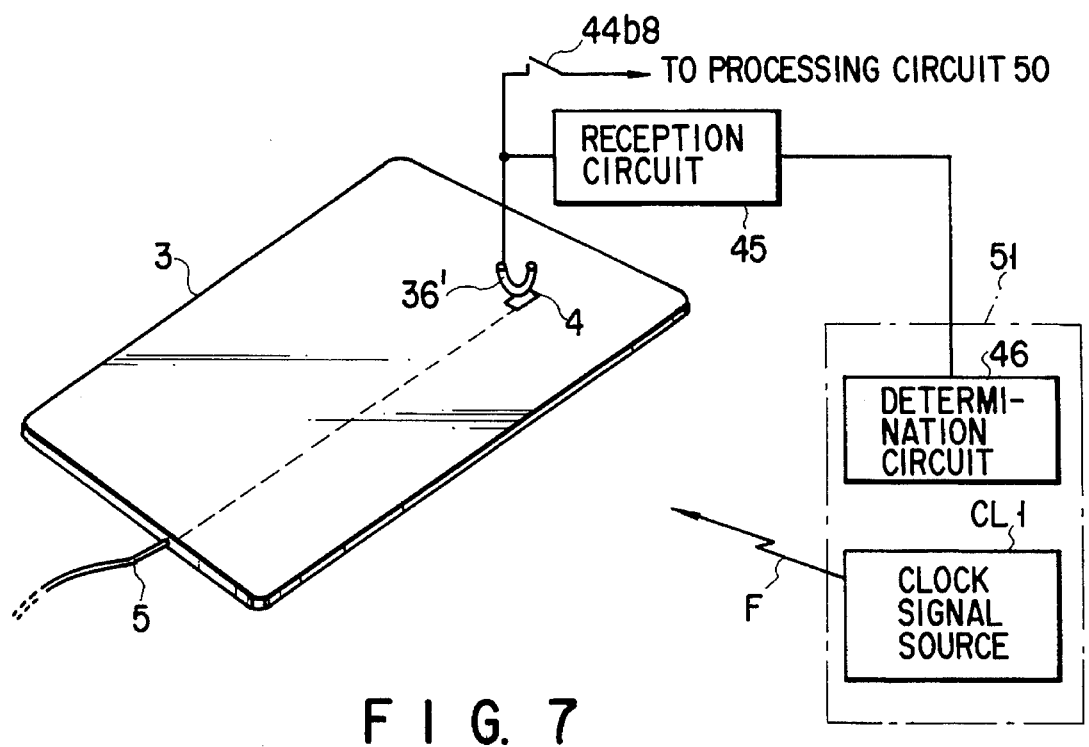
F I G. 7
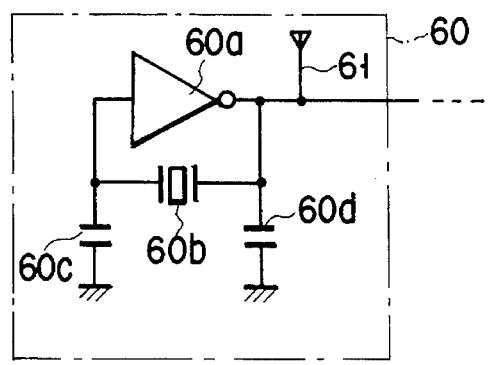
F I G. 8

IC CARD PROCESSING APPARATUS HAVING FUNCTION FOR DETECTING AND PROTECTING DISHONEST UTILIZATION USING SWITCH MEANS

BACKGROUND OF THE INVENTION

1. Field of the Invention

The present invention generally relates to an IC card processing apparatus and, more particularly, to an IC card processing apparatus having a function for detecting and protecting dishonest utilization using a switch means when a read/write process is to be performed to an IC card having a memory circuit and the like formed therein.

2. Description of the Related Art

As is well known, an IC card, unlike a magnetic recording card, electrically stores various kinds of information in a memory, and is formed such that the information is exchanged between the IC card and an external apparatus connected to the card through terminals arranged on the outer surface portion of the card.

FIG. 9 shows an example of a conventionally known IC card 1. An integrated circuit (not shown) including a memory and the like are incorporated in the IC card 1. A plurality of external terminals 2 connected to the internal integrated circuit are respectively arranged at predetermined positions near the leading end on one surface 1a of the card 1.

When such an IC card does not electrically exchange predetermined information with the external apparatus through the external terminals, information unique to a card holder, transaction information, or the like cannot be recognized. For this reason, the IC card does not allow dishonest utilization easier than a magnetic card, and the contents of the IC card are not changed by an external magnetic force. Therefore, IC cards have been used in place of magnetic cards.

An IC card processing apparatus for reading/writing information from/in an IC card receives an IC card inserted from a card insertion port until a predetermined portion including at least the external terminal portion of the IC card is inserted into the apparatus, and contact terminals are brought into contact with the external terminals of the card in the apparatus, respectively, thereby receiving and transmitting information through the contact terminals.

However, such an IC card processing apparatus may not protect dishonest utilization by a wrong card 3 shown in FIG. 10 and an information decoding apparatus (not shown). More specifically, the wrong card 3 has the same shape as that of a proper IC card and external terminals 4 respectively arranged at the same positions as those of the proper IC card, and conductive lines 5 extend from at least some of the external terminals. This wrong card 3 is inserted into the IC card processing apparatus to bring the external terminals 4 into contact with the contact terminals in the apparatus, and the information decoding apparatus is connected to the distal ends of the conductive lines 5, thereby decoding the format, data, or the like of information exchange performed between the IC card processing apparatus and the IC card. On the basis of the decoding result, information may be exchanged between the wrong card and the IC card processing apparatus in the same manner as that of the proper card.

In a card processing apparatus which completely receives an IC card into the apparatus, the presence of the conductive lines is certainly mechanically or optically detected to prevent such dishonest utilization. In a card processing apparatus in which a card is manually inserted and discharged, the trailing portion of the card is exposed from a card insertion port. For this reason, when conductive lines are drawn from this exposed portion, the presence of the conductive lines cannot be mechanically or optically detected.

As a prior art for solving this problem, as in an IC card processing apparatus 10 shown in FIG. 11, electrode plates 13 and 14 are arranged between a card insertion port 11 and contact terminals 12 to oppose an inserted card, and a static capacitance determination circuit 15 for checking whether the capacitances between the contact terminals 12 and the electrode plates 13 and 14 are larger than a predetermined value is arranged. When the wrong card 3 is inserted to a position where the external terminals 4 are brought into contact with the contact terminals 12, increases in static capacitances between the conductive lines of the wrong card 3 and the electrode plates 13 and 14 are detected to determine that the received card is a wrong card.

However, in the prior art in which the conductive lines of the wrong card are detected by the static capacitances between the electrode plates and the conductive lines, the static capacitances considerably change depending on the distances between the electrode plates and the conductive lines or the diameters of the conductive lines. When very thin conductive lines are located at a position distant from the electrode plates, the static capacitances therebetween are very small, and it is very difficult to certainly determine the presence/absence of the conductive lines on the basis of the very small changes in static capacitances.

In the above prior art, there are problems that a conductive plate such as an electrode plate must be attached to a card storage unit to satisfy severe conditions, and the shape of the card storage unit is strictly limited. In addition, for example, when a wrong card cut shorter than a proper IC card, a piece of paper, or the like is inserted into the card processing apparatus, since this wrong card, piece of paper, or the like cannot be discharged from the card storage unit due to the presence of the plate, a card jam is caused.

SUMMARY OF THE INVENTION

It is, therefore, an object of the present invention to provide a new and improved IC card processing apparatus having a function for detecting and protecting dishonest utilization using a switch means in which the presence of a conductive line formed to intend dishonest utilization can be certainly detected without being affected by the diameter and position of the conductive line connected to an IC card to intend dishonest utilization and without limiting the shape of the IC card processing apparatus, and a wrong card or the like shorter than a regular length can be discharged by forming a sufficiently large opening in the lower surface of a card storage unit.

According to the present invention, there is provided an IC card processing apparatus comprising:

an insertion port for receiving an IC card having an external terminal; an IC card storage unit for storing the IC card inserted from the insertion port; a contact terminal to be brought into contact with the external terminal of the IC card inserted from the insertion port; detection means for detecting that the IC card is inserted from the insertion port to a predetermined position of the IC card storage unit; an information processing circuit for exchanging information with the external terminal through the contact terminal; and wrong card detection means, having a terminal capable of being brought into contact with the contact terminal, for detecting that a wrong card including a conductive line extending from the terminal is inserted from the insertion port, the wrong card detection means comprising:
a) switch means, arranged near the contact terminal, for disconnecting a connection between the contact terminal and the information processing circuit in response to a detection signal from the detection means;
b) a reception circuit for detecting an electric field strength appearing at the contact terminal when the connection between the contact terminal and the information processing circuit is disconnected by the switch means;
c) a determination circuit for receiving an output from the reception circuit to determine whether the electric field strength exceeds a predetermined value; and
d) switch control means for switching, when the determination of the determination circuit is completed, the switch means to connect the contact terminal to the information processing circuit.

Additional objects and advantages of the invention will be set forth in the description which follows, and in part will be obvious form the description, or may be earned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic side view showing an IC card processing apparatus according to an embodiment of the present invention;

FIG. 2 is a schematic plan view showing the IC card processing apparatus according to the embodiment of the present invention;

FIG. 3 is a view showing the circuit arrangement of the IC card processing apparatus according to the embodiment of the present invention;

FIG. 4 is a detailed circuit block diagram showing the main part of the circuit arrangement of the IC card processing apparatus according to the embodiment of the present invention;

FIG. 6 is a view for explaining the operation of the IC card processing apparatus according to the embodiment of the present invention;

FIG. 7 is a view for explaining the operation of the IC card processing apparatus according to the embodiment of the present invention;

FIG. 8 is a circuit diagram for explaining another embodiment of the present invention;

DETAILED DESCRIPTION OF THE PREFERRED EMBODIMENTS

Figure 5:
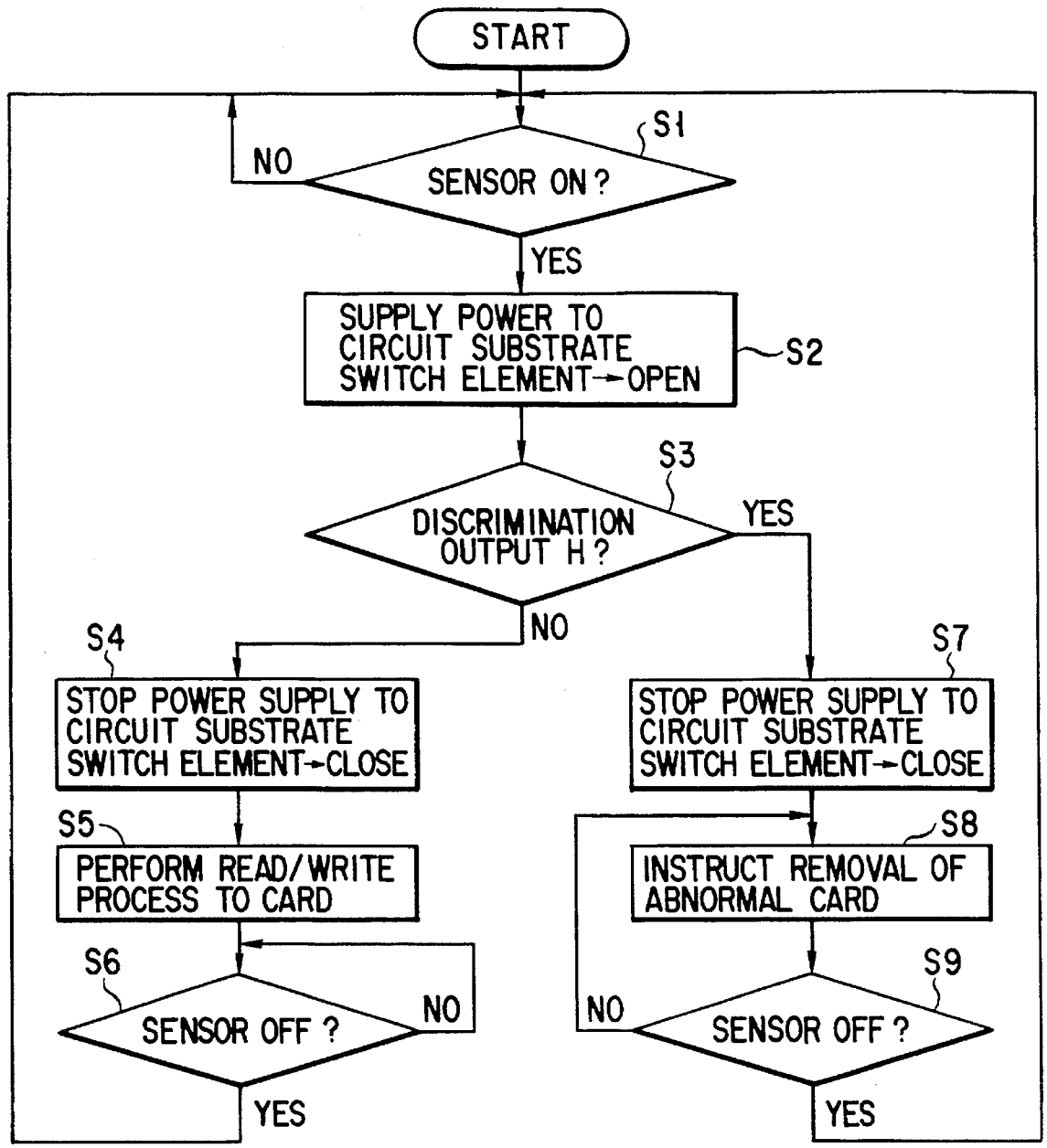
FIG. 5 is a flow chart showing the processing sequence of the processing circuit shown in FIG. 3.
Figure 9:
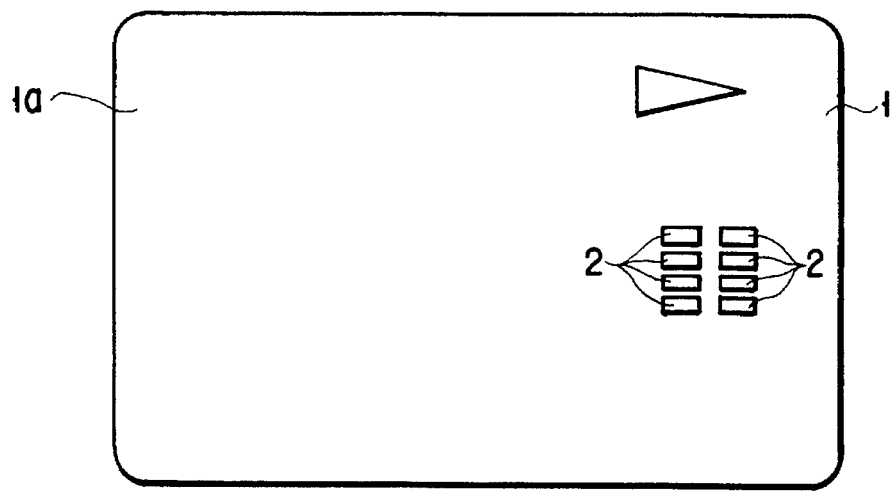
FIG. 9 is a view showing a conventionally known IC card.
Figure 10:
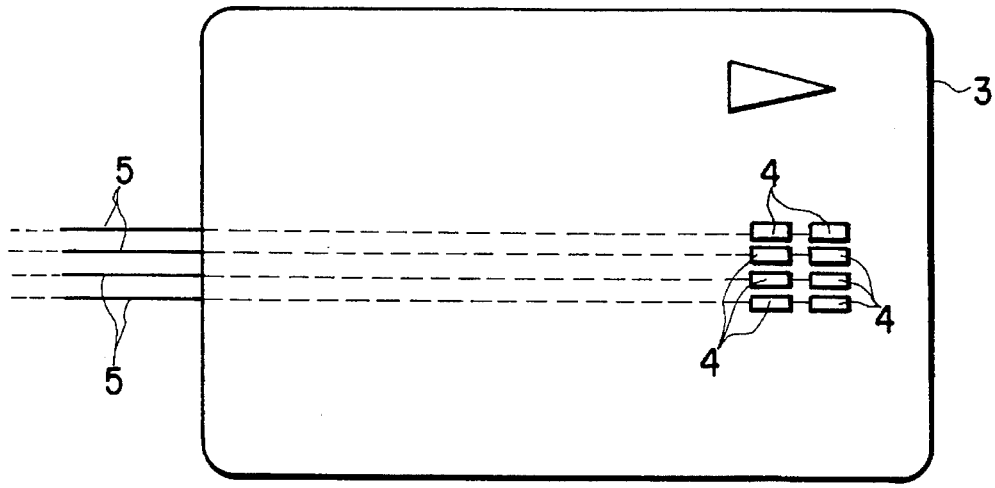
FIG. 10 is a view showing a card used in dishonest utilization.
Figure 11:
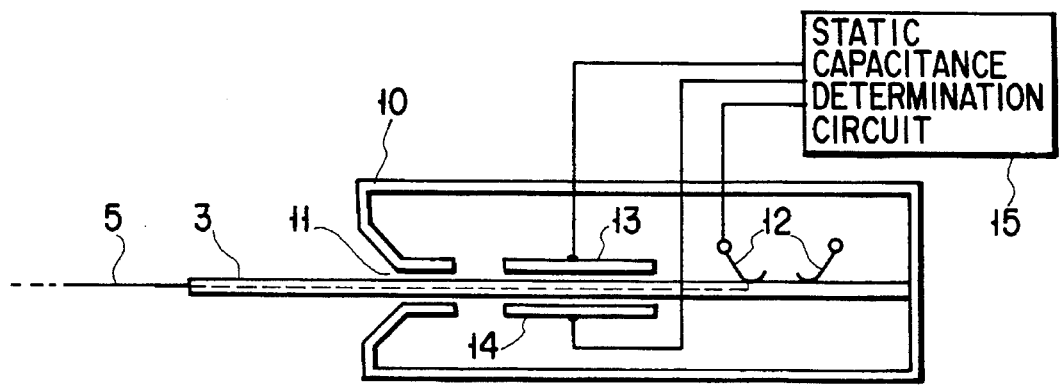
FIG. 11 is a schematic view showing a conventional IC card processing apparatus.

Reference will now be made in detail to the presently preferred embodiments of the invention as illustrated in the accompanying drawings, in which like reference characters designate like or corresponding parts throughout the several drawings.

The present invention will be briefly described below. In order to solve the above problems, an IC card processing apparatus according to the present invention comprises an insertion port for receiving an IC card having an external terminal; an IC card storage unit for storing the IC card inserted from the insertion port; a contact terminal to be brought into contact with the external terminal of the IC card inserted from the insertion port; detection means for detecting that the IC card is inserted from the insertion port to a predetermined position of the IC card storage unit; an information processing circuit for exchanging information with the external terminal through the contact terminal; and wrong card detection means, having a terminal capable of being brought into contact with the contact terminal, for detecting that a wrong card including a conductive line extending from the terminal is inserted from the insertion port, the wrong card detection means comprising:
a) switch means, arranged near the contact terminal, for disconnecting a connection between the contact terminal and the information processing circuit in response to a detection signal from the detection means;
b) a reception circuit for detecting an electric field strength appearing at the contact terminal when the connection between the contact terminal and the information processing circuit is disconnected by the switch means;
c) a determination circuit for receiving an output from the reception circuit to determine whether the electric field strength exceeds a predetermined value; and
d) switch control means for switching, when the determination of the determination circuit is completed, the switch means to connect the contact terminal to the information processing circuit.

With the above arrangement, in the IC card processing apparatus according to the present invention, when a wrong card whose external terminal is connected to a conductive line is inserted from the card insertion port, and the external terminal is brought into contact with the contact terminal, a radio wave radiated from the high-frequency signal source of the electronic circuit arranged at the predetermined position of the housing is induced to the conductive line of the wrong card, and the signal is received through the contact terminal. In this manner, insertion of the wrong card is determined on the basis of the reception output of the signal. In addition, since the processing circuit can be disconnected from the reception circuit by the switch element, the voltage induced to the lead wire connecting the information processing circuit and the contact terminal is blocked to input to the reception circuit. In this manner, the voltage induced to the conductive line of the wrong card and the voltage induced to the external terminal of a proper card can be taken a sufficient value to distinguish the difference therebetween.

An embodiment of the present invention will be described below with reference to the accompanying drawings.

FIGS. 1 and 2 show a mechanism unit 21 of an IC card processing apparatus, arranged in a housing 18 of a public telephone set consisting of, e.g., a metal, for processing a prepaid IC memory card which stores call rate information, a communication control unit 51 constituting the IC card processing apparatus together with the mechanism unit 21 and including a processing circuit 50 and a determination circuit 46.

In this case, the communication control unit 51 is fixed at a predetermined position separated from the mechanism unit 21 and performs not only a read/write process to an IC card inserted into the mechanism unit 21 but also a control operation of data communication performed by a personal computer, a wordprocessor, or the like connected to the mechanism unit 21 through a modular connector 53 arranged on one surface of the housing 18 for normal speech communication control. Clock signal sources (high-frequency signal sources) CL1, CL2 .... including a clock signal source or the like for the processing circuit 50 are arranged in the communication control unit 51 to perform control operations. Although signals from these clock signal sources are very weak, these signals are radiated into the housing 18.

The mechanism unit 21 is integrally formed by a resin guide member 22 (which may consist of a metal to prevent misuse of a public telephone set) and a resin housing 30, fixed to the rear portion of the guide member 22, for receiving a card guided by the guide member 22.

The guide member 22 is constituted by a central portion 22a having a card insertion port 23 formed therein and opposing projecting portions 22b and 22c projecting forward from both the ends of the central portion 22a, and the guide member 22 is formed to have a U shape when viewed from the upper direction. The interval between the opposing surfaces of the two projecting portions 22b and 22c is set to be slightly smaller than the width of an IC card, and guide grooves 24, continuous with the card insertion port 23, for horizontally guiding an IC card, which is inserted from the forward direction, toward the card insertion port 23 are formed on the opposing surfaces of the projecting portions, respectively. Flanges 25 are formed on both the sides of the guide member 22, and the flanges 25 are fixed to the inner surfaces of the housing 18 with screws, so that the mechanism unit 21 is entirely supported by the housing 18.

The housing 30 is formed to have an almost rectangular shape and an opening formed in the lower surface thereof, and a middle plate 31 having a lower surface side on which a card storage unit 30a is formed is arranged at the middle stage portion of the housing 30 to vertically partition the interior of the housing 30.

A hole 33 is formed to vertically extend through the almost central portion of the middle plate 31. A terminal plate 35 is located in this hole 33. A plurality of contact terminals 36 to be brought into contact with the external terminals of an IC card and having spring characteristics are attached to the middle plate 31 to project downward from the lower surface of the middle plate 31.

A sensor 38 (e.g., a mechanical sensor such as a microswitch or an optical sensor constituted by a light-emitting element and a light-receiving element) is arranged in the rear portion of the housing 30. The lower surface of the card storage unit 30a has a large opening to cause a wrong card cut shorter than a proper card, dust, or the like to drop downward.

A circuit board 40 is attached to an upper surface 31b of the middle plate 31. One terminal of each contact terminal 36 of the terminal plate 35 is connected to the circuit board 40. FIG. 3 shows a circuit (including the sensor 38) formed on the circuit board 40 and a communication control unit 51 including the determination circuit 46, the processing circuit 50, and the clock signal source CL1 to constitute the IC card processing apparatus together with the mechanism unit 21.

The plurality of contact terminals 36 on the circuit board 40 are connected to the processing circuit 50 through switch elements (constituted by 8 circuits and 8 contact points) 44b1 to 44b8 of a relay 44 and board terminals 43a (although one terminal is shown in FIG. 3, the board terminals 43a are, in fact, constituted by eight terminals). A reception circuit 45 for selectively receiving and detecting only a signal, of signals appearing at one contact terminal 36' of the contact terminals 36, having the same frequency as that of a frequency F (e.g., 2.5 MHz) of one clock signal source (e.g., the clock signal source CL1) in the above communication control unit 51 is connected to the contact terminal 36' with the shortest distance. A determination circuit 46 for checking, on the basis of an output from the reception circuit 45, whether an inserted card has a wrong conductive line connected thereto is connected to the output terminal of the reception circuit 45 through a board terminal 43b. The determination output from the determination circuit 46 is supplied to the processing circuit 50, and an output from the sensor 38 is supplied to the processing circuit 50 through a board terminal 43c. In addition, a coil 44a of the relay 44 and the reception circuit 45 which are arranged on the circuit board 40 receive power from the processing circuit 50 through a board terminal 43d.

FIG. 4 shows the detailed arrangement of the switch element 44b8, the reception circuit 45, and the determination circuit 46. The switch element 44b8 is set in an open state during an operation for causing the sensor 38 to detect card insertion so as not to supply a high-frequency signal from the communication control circuit 51 to the reception circuit 45 through the board terminal 43a. In this case, since the switch elements 44b1 to 44b8 arranged between all the contact terminals 36 not only the contact terminal 36' and the processing circuit 50 are set in an open state, the high-frequency signal through the processing circuit 50 and the board terminal 43a can be prevented from being output to the contact terminal 36' through the circuit in the IC card.

The reception circuit 45 is constituted as a superheterodyne reception circuit in which a signal obtained by causing a high-frequency amplifier 45a to amplify a signal appearing at the contact terminal 36' and a local oscillation signal from a local oscillator 45b are input to a mixer 45c, and one of the mixed signals output from the mixer 45c, passing through an intermediate frequency filter 45d, is amplified by an intermediate frequency amplifier 45e and detected by a detector 45f.

Note that the frequency of a local oscillation signal from the reception circuit 45 is set to be a frequency higher (or lower) than the frequency F of the clock signal source CL1 by a center frequency passing through the local oscillator 45b to detect only a radio wave radiated from the clock signal source CL1 of the communication control unit 51.

The determination circuit 46 causes a comparator 46a to compare a detection output from the detector 45f with a reference voltage Vr to output an H (High)-level signal when the detection output is higher than the reference voltage Vr and to output an L (Low)-level signal when the detection output is lower than the reference voltage Vr. The reference voltage Vr is preset to be higher than an output, obtained from the reception circuit 45 when a proper card is inserted, by a voltage corresponding to a predetermined margin value, and the reference voltage vr is preset to be lower than an output obtained from the reception circuit 45 when a conductive line having a predetermined length (about card length) is connected to the contact terminal 36'.

The processing circuit 50 performs, on the basis of a signal from the sensor 38 and a signal from the determination circuit 46, power supply to the circuit board 40 and a read/write process of information to an IC card through the switch elements 44b1 to 44b8 and the contact terminals 36.

FIG. 5 is a flow chart showing the processing sequence of the processing circuit 5. The operation of the card processing apparatus will be described below with reference to this flow chart. Note that, in this case, the communication control unit 51 is energized in advance, and a very weak radio wave is radiated from the clock signal source CL1 having the frequency F into the housing 18.

When the proper IC card 1 is inserted to be guided by the guide grooves 24 of the guide member 22, this card is conveyed in the card storage unit 30a. When the card reaches a predetermined position, as shown in FIG. 6, external terminals 4 of the card are brought into contact with the contact terminals 36, respectively, and the sensor 38 detects insertion of the IC card 1 to turn on the card processing apparatus.

The processing circuit 50 detects this card insertion on the basis of a signal from the sensor 38 and supplies power to each circuit on the circuit board 40 to set the switch elements 44b1 to 44b8 in an open state (steps S1 and S2).

At this time, although a radio wave radiated into the housing 18 is induced to the external terminals 4, the integrated circuit, and the like in the IC card 1 located in the card storage unit 30a, the line length of these circuits is very small, and lines continuous with the processing circuit 50 are disconnected by the switch elements 44b1 to 44b8 at near the contact terminals 36. For this reason, the level of a signal appearing at the contact terminal 36' is very low, and the detection output from the reception circuit 45 is lower than the reference voltage Vr. Therefore, an output from the determination circuit 46 goes to L level. When the determination output is produced by the determination circuit 46, the processing circuit 50 stops power supply to the circuit board 40. Therefore, the switch elements 44b1 to 44b8 are set in a closed state.

When the processing circuit 50 receives the L-level output from the determination circuit 46, the processing circuit 50 defines the inserted card as a proper card and, performs a read/write process (a process of subtracting a charge call rate from the remaining call rate) to the inserted card (steps S3 to S5). Upon completion of the read/write process, the processing circuit 50 monitors a signal from the sensor 38 and confirms that the card is removed, thereby completing the process for this card (step S6).

As shown in FIG. 7, when a wrong card 3 having the conductive lines 5 described above is inserted into the card processing apparatus, one of the conductive lines 5 of the wrong card 3 is connected to the contact terminal 36' through the external terminal 4. For this reason, a state equivalent to a state wherein a reception antenna for strongly receiving radio waves emitted from the plurality of clock signal sources CL1, CL2,...., of the communication control unit 51 is connected to the contact terminal 36' is set, and high-frequency signals radiated from the plurality of clock signal sources appear at the contact terminal 36'. Since the conductive line 5 operates as a reception antenna, the level of each high-frequency signal becomes very high because the level is rarely affected by the position or diameter of the conductive line 5. The radio wave radiated from the clock signal source CL1 having the predetermined frequency F is selectively amplified by the reception circuit 45, and supplied to the determination circuit 46, and an output from the determination circuit 46 goes to H level.

When receiving the H-level signal from the determination circuit 46, the processing circuit 50 defines an inserted card as a wrong card, and then supplies a signal representing to remove the card to a display unit (not shown), without performing a read/write process. The sensor 38 confirms removal of the card, thereby completing the process for the wrong card (steps S7 to S9).

Even if a person who will intend dishonest utilization covers the conductive line of the wrong card with a shield, this shielded conductor does not reach the ground line of the reception circuit 45, and the reception output unexpectedly increases. Therefore, the same determination result as described above can be obtained.

In this manner, when an IC card inserted from the card insertion port 23 is a wrong card, proper information is not exchanged between this card and the card processing apparatus. For this reason, the sequence or the like of the information is not known, thereby protecting dishonest utilization of the apparatus.

Even if a proper card is inserted into the card processing apparatus, and a strong external radio wave having the frequency F reaches the outside of the housing 18, this external radio wave does not invade in the housing 18 and does not affect the determination operation by electromagnetically shielding the housing 18, in advance.

In addition, when a wrong card is inserted into the card processing apparatus, and the card processing apparatus receives an external radio wave, the radio wave is induced to the conductive line 5 of the wrong card projecting outside the housing 18, and signals appearing at the contact terminal 36' is a signal obtained by superposing a signal radiated from the clock signal source CL1 on the external signal. In this case, when the frequency of the external signal is equal to or close to the frequency F, the reception circuit 45 detects the external signal together with the signal from the clock signal source CL1, so that a detection output higher than the detection output obtained when the reception circuit 45 receives only the signal from the clock signal source CL1. Therefore, a wrong card having the conductive line 5 is not erroneously determined as a proper card.

As in this embodiment, in the card processing apparatus having a card storage unit having a large opening formed in the lower surface thereof, for example, even when a wrong card cut half is inserted, this card drops from the opening. For this reason, the card processing apparatus is not set in a disabled state caused by a card jam. In addition, a component, of a radio wave radiated from each clock signal source, directly radiated to the card increases by the opening, and the wrong card having the conductive line 5 is advantageously detected.

In the above embodiment, although the card processing apparatus is controlled such that power is supplied to all the circuits for detecting a conductive line during only an operation of checking whether an inserted card is a proper card or a wrong card, any one of the operations of the reception circuit 45 and the determination circuit 46 may be controlled. In addition, these circuits may always be operated, and an output from the determination circuit 46 may be confirmed after information exchange between an IC card and the card processing apparatus.

In addition, in the above embodiment, a very weak radio wave leaking and radiated from a clock signal source arranged in the communication control unit 51 located at a position spaced apart from the mechanism unit of the IC card processing apparatus is received. However, for example, as shown in FIG. 8, when an antenna line 61 is connected (or is pattern-formed) to a clock signal source 60 formed by connecting the input/output terminals of an inverter 60a to each other by a quartz oscillator 60b and connecting capacitors 60c and 60d to both the terminals of the quartz oscillator 60b, a radio wave having the frequency F and output from the clock signal source 60 is strongly radiated. For this reason, the level of a signal input to the reception circuit 45 increases, and the presence/absence of the conductive line of the card can be determined at a high S/N ratio.

According to the above embodiment, in order to receive a very weak radio wave, the superheterodyne reception circuit 45 is used. However, if strong radio waves are radiated from high-frequency signal sources, a reception circuit can be constituted by only a filter and a detector, or an amplifier in addition to the filter and the detector. In this case, the amplifier may be connected to the input terminal of the filter or between the filter and the detector. In addition, in an apparatus which includes only one high-frequency signal source, a filter can be omitted.

In the embodiment, although the determination circuit 46 is arranged in the communication control unit 51 separated from the mechanism unit 21, the determination circuit 46 may be arranged on the circuit board 40 on the mechanism unit 21 side.

In the embodiment, although the switch elements 44b1 to 44b8 of the relay 44 are used as switch elements, a semiconductor switch (e.g., an analog switch, a gate switch, or a photocoupler) or a filter circuit capable of performing signal separation for a high-frequency signal may be used in place of the relay 44.

In the embodiment, although an output from the reception circuit 45 is used only to detect the conductive line of a wrong card, it may be checked on the basis of this reception output whether the detection circuit is entirely normally operated.

In the embodiment, a manual insertion type IC card processing apparatus has been described. However, the present invention can be similarly applied to a card processing apparatus in which an IC card inserted from a card insertion port is completely received into a card storage unit.

As described above, in an IC card processing apparatus according to the present invention, a radio wave radiated from a high-frequency signal source of an electronic circuit located at a position separated from a card storage unit is induced to the conductive line of a wrong card received into the card storage unit, and a signal appearing at a contact terminal which is in contact with an external terminal of the card connected to the conductive line is received, thereby determining, on the basis of the reception output, that the inserted card is a wrong card.

As described above, according to the present invention, since the conductive line of a wrong card is used as reception antenna for receiving a radio wave radiated into the housing, the diameter and the position of the conductive line rarely affect a reception output, and the wrong card can be certainly detected.

According to the present invention, unlike the prior art, a conductive plate for capacitively coupling the conductive line of a wrong card, a plate for emitting an electromagnetic wave, and the like need not be arranged between the card insertion port and the contact terminals. For this reason, the shape of the card storage unit is not limited, and a large opening can be formed in the lower surface of the card storage unit, thereby preventing a card jam caused by insertion of a card cut shorter than a proper card, a piece of paper, or the like.

Additional embodiments of the present invention will be apparent to those skilled in the art from consideration of the specification and practice of the present invention disclosed herein. It is intended that the specification and examples be considered as exemplary only, with the true scope of the present invention being indicated by following claims.

What is claimed is:

1. An IC card processing apparatus comprising:
   an insertion port for receiving an IC card having an external terminal;
   an IC card storage unit for storing said IC card inserted from said insertion port;
   a contact terminal to be brought into contact with said external terminal of said IC card inserted from said insertion port;
   detection means for detecting that said IC card is inserted from said insertion port to a predetermined position of said IC card storage unit;
   an information processing circuit for exchanging information with said external terminal through said contact terminal; and
   wrong card detection means, having a terminal capable of being brought into contact with said contact terminal, for detecting that a wrong card including a conductive line extending from said terminal is inserted from said insertion port,
   said wrong card detection means comprising:
   a) switch means, arranged near said contact terminal, for disconnecting a connection between said contact terminal and said information processing circuit in response to a detection signal from said detecting means;
   b) a reception circuit for detecting an electric field strength appearing at said contact terminal when the connection between said contact terminal and said information processing circuit is disconnected by said switch means;
   c) a determination circuit for receiving an output from said reception circuit to check whether the electric field strength exceeds a predetermined value; and
   d) switch control means for switching, when the determination of said determination circuit is completed, said switch means to connect said contact terminal to said information processing circuit.

2. An apparatus according to claim 1, wherein said switch means includes a relay contact.

3. An apparatus according to claim 1, wherein the electric field includes a high-frequency component leaking and radiated from a specific clock signal source used in said information processing circuit.

4. An apparatus according to claim 1, wherein a large opening is formed in a lower surface of said IC card storage unit to cause the IC card storage unit to drop a card cut shorter than a proper IC card, dust, and the like downward.

5. An apparatus according to claim 3, wherein said reception circuit includes a superheterodyne reception circuit for detecting that a high-frequency component radiated from said specific clock signal source appears at said connection terminal.

6. An apparatus according to claim 1, wherein said contact terminal is connected to said reception circuit with a shortest distance.

7. An apparatus according to claim 1, wherein, when said contact terminal comprises a plurality of contact terminals, said switch means includes a plurality of switches for respectively disconnecting connections between said plurality of contact terminals and said information processing circuit.

8. An apparatus according to claim 1, wherein said determination circuit uses a reference voltage which is preset to be higher than an output, obtained from said reception circuit when a proper card is inserted, by a voltage corresponding to a predetermined margin and to be lower than an output obtained from said reception circuit when a conductive line having a predetermined length is connected to said contact terminal.

9. An apparatus according to claim 1, further comprising:

power supply control means for supplying power to said reception circuit in response to a detection signal from said detection means and stopping power supply to said reception circuit in response to a determination completion of said determination circuit.

10. An apparatus according to claim 1, wherein said apparatus is accommodated in a housing shielded electromagnetically.

11. An apparatus according to claim 10, further comprising:

radio wave radiation means including a dedicated clock signal source to the electric field and an antenna for radiating a radio wave from said dedicated clock signal source into said housing.

12. An apparatus according to claim 1, wherein said IC card includes a prepaid IC memory card which stores call rate information for a public telephone set.

\* \* \* \* \*